United States Patent

Irwin

[11] Patent Number: 5,691,443
[45] Date of Patent: *Nov. 25, 1997

[54] DRAWABLE HIGH TENSILE STRENGTH ARAMIDS

[75] Inventor: Robert Samuel Irwin, Wilmington, Del.

[73] Assignee: E. I. Du Pont de Nemours and Company, Wilmington, Del.

[*] Notice: The term of this patent shall not extend beyond the expiration date of Pat. No. 5,346,985.

[21] Appl. No.: 525,242

[22] Filed: Sep. 8, 1995

Related U.S. Application Data

[60] Division of Ser. No. 662,197, Feb. 27, 1991, Pat. No. 5,459,231, which is a continuation-in-part of Ser. No. 540,889, Jun. 21, 1990, abandoned, which is a continuation-in-part of Ser. No. 502,598, Mar. 30, 1990, abandoned.

[51] Int. Cl.$^6$ ............ C08G 69/08; B29C 51/00; D01D 5/00
[52] U.S. Cl. .......... 528/331; 528/335; 528/338; 528/348; 252/183.11; 264/164; 264/165; 264/178 F; 264/184; 264/346
[58] Field of Search .......... 528/335, 331, 528/338, 348; 252/183.11; 264/164, 165, 178 F, 184, 346

[56] References Cited

U.S. PATENT DOCUMENTS

| | | | |
|---|---|---|---|
| 3,349,062 | 10/1967 | Hill et al. | 260/47 |
| 3,869,429 | 3/1975 | Blades | 260/78 S |
| 3,869,430 | 3/1975 | Blades | 260/78 S |
| 4,075,172 | 2/1978 | Ozawa et al. | 260/47 CZ |
| 4,384,107 | 5/1983 | Rogers et al. | 528/183 |
| 4,413,114 | 11/1983 | Shimada et al. | 528/183 |
| 4,461,886 | 7/1984 | Rogers et al. | 528/331 |
| 4,500,278 | 2/1985 | Cochran et al. | 425/445 |
| 4,507,467 | 3/1985 | Shimada et al. | 528/348 |
| 4,525,413 | 6/1985 | Rogers et al. | 428/212 |
| 4,785,038 | 11/1988 | Sweeny | 524/173 |
| 5,274,071 | 12/1993 | Santa et al. | 528/329.1 |
| 5,346,985 | 9/1994 | Irwin | 528/331 |

FOREIGN PATENT DOCUMENTS

| | | | |
|---|---|---|---|
| 63-006108 | 1/1988 | Japan | D01F 6/60 |
| 63-165515 | 7/1988 | Japan | D01F 6/80 |

OTHER PUBLICATIONS

Ozawa, S., "A New Approach to High Modulus, High Tenacity Fibers", *Poly. J.*, 19(1), 119–125 (1987) The month of publication not available.

*Primary Examiner*—Samuel A. Acquah
*Assistant Examiner*—P. Hampton-Hightower

[57] ABSTRACT

Aramids which after drawing have high tensile strengths and tensile moduli are made from units derived from selected 2,2'-disubstituted-4,4'-diaminobiphenyls, p-phenylenediamine, oxydianiline and terephthalic acid. Also disclosed is a process for drawing such aramids at least 1.5%, which results in the drawn aramid having significant crystallinity and higher tensile strength. The aramids are useful for ropes and composites.

36 Claims, No Drawings

DRAWABLE HIGH TENSILE STRENGTH ARAMIDS

CROSS-REFERENCE TO RELATED APPLICATION

This is a division of application Ser. No. 07/662,197, filed Feb. 27, 1991, now U.S. Pat. No. 5,459,231 granted Oct. 17, 1995 which is a continuation-in-part of U.S. Ser. No. 07/540,889, filed Jun. 21, 1990, abandoned, which is a continuation-in-part of U.S. Ser. No. 07/502,598, filed Mar. 30, 1990 abandoned.

FIELD OF INVENTION

Aramid polymers whose fibers and films are drawable and after drawing possess a combination of very high tensile strength, tensile elongation and modulus, are provided. Also provided is a process for drawing such fibers.

BACKGROUND OF THE INVENTION

It is well known in the art that para-aramid polymers, such as those derived from terephthalic acid (T) and p-phenylenediamine (PPD) have a high modulus and relatively high tensile strength compared with conventional fibers. Such polymers are highly crystalline, and can be drawn very little, usually less than about 1%. Drawing and heat treating (annealing) of such polymers may result in large increases in modulus, but virtually no change in tensile strength. It is an objective of this invention to provide polymers which are relatively high in modulus, and drawable (much more than 1%), and whose tensile strength is greatly improved after drawing. Thus, selected substituted 4,4'-diaminobiphenyls (benzidines) are used to replace specific amounts of PPD in PPD/T polymers to form drawable aramids.

In another embodiment copolymers of 3,4'-diaminodiphenyl ether (herein sometimes referred to as ODA) and selected substituted 4,4'-diaminobiphenyls with terephthalic acid are also drawable aramids.

U.S. Pat. No. 3,349,062 mentions the possible use of 2,2'-dichloro-4,4'-diaminobiphenyl in aramids (at col. 6, line 58) but mentions no specific polymer incorporating this monomer.

In U.S. Pat. No. 4,785,038 a polymer reportedly derived from isophthalic acid and 2,2-dichloro-4,4'-diaminobiphenyl is made (Example 8).

In U.S. Pat. Nos. 4,384,107, 4,461,886 and 4,525,413 2,2'-dichloro-, 2,2'-dibromo- and 2,2'-dimethyl-4,4'-diaminobiphenyl are mentioned (in Examples 13, 17 and 15) as possible comonomers in aramids with various possible 4,4'-biphenyldicarboxylic acids. Also 2,2'-dibromo-4,4'-diaminobiphenyl is used in several examples in each patent to make aramids from biphenyl or stilbene containing diacids.

Japanese Patent Application 86/315,111 describes the aramids from 2,2'-dimethyl- and 2,2'-dichloro-4,4'-diaminobiphenyl, terephthalic acid, and 1,4-bis(4-aminophenoxy)benzene.

U.S. Pat. Nos. 4,075,172, 4,413,114 and 4,507,467 describe aramids prepared from ODA, units derived from terephthalic acid and other diamines. However, no mention is made of the use of substituted 4,4'-diaminobiphenyls. These aramids may be drawn up to about 1000%, but the resulting drawn polymers, in form of a fiber, for instance, are amorphous.

European Patent Application 367,535 discloses aramids made from terephthalic acid, p-phenylenediamine, 3,4'-diaminodiphenyl ether, and substituted 4,4'-diaminobiphenyls with particular compositional ranges. For example, one polymer specifically disclosed is a copolymer of 2,2'-dimethyl-4,4'-diaminobiphenyl, terephthalic acid, 3,4'-diaminodiphenyl ether and terephthalic acid. The broadest compositional range disclosed in 367,535 for polymers containing first, second and third units (see below) overlap with the broadest compositional range claimed herein of polymers containing first, second and third units (see below). However, the range claimed herein does not overlap with the preferred range in 367,535, and no polymers claimed herein were actually made in 367,535. Furthermore, the inventors of 367,535 don't mention the drawability and excellent properties of the drawn polymers of the selected polymer compositions claimed herein.

In none of the above patents except EP 367,535 is a copolymer of 2,2'-dichloro-, 2,2'-dibromo- or 2,2'-dimethyl-4,4'-diaminobiphenyl with terephthalic acid, with or without units derived from PPD, specifically mentioned.

The drawing of polymers in general is well known to those skilled in the art, but the drawing of some aramids is more difficult. It is known to those skilled in the art that certain aramids that are essentially noncrystalline may be readily drawn. But crystalline aramids (such as PPD/T), which have the advantage of having relatively high tensile moduli and strengths are not readily drawable, that is they can normally be drawn only about 1–2% or less without substantial improvement of tensile strength. Higher amounts of draw would be expected to lead to still better alignment of the polymer chains and hence higher tensile strengths. Thus, it would be desirable to be able to draw aramids, as in the fiber form, such that the "highly" drawn aramid would have improved tensile strength and have substantial crystallinity.

U.S. Pat. No. 3,869,430 describes the drawing of PPD/T fibers, and says they can be drawn up to about 3%. However, in the only example in which they are drawn, they are reported drawn from 0.1 to 2.1%.

Example 1 of U.S. Pat. No. 3,869,429 describes the drawing of a PPD/T fiber 0.5%.

U.S. Pat. No. 4,500,278 describes the drawing of PPD/T fibers, and discloses that it is possible to draw the fibers up to 1.6%.

Japanese Patent Application 63/006108 discloses the drawing of PPD/T fiber greater than 2%. However this fiber contains more than 50% water.

SUMMARY OF THE INVENTION

A drawable aramid random copolymer is provided which consists essentially of about 70 to about 95 mole percent of units derived from PPD and T ("first units" herein) and about 30 to about 5 mole percent of units derived from 2,2'-disubstituted-4,'4-diaminobiphenyl and T ("second units" herein), wherein the 2,2' substituents are chlorine, bromine and methyl. Another drawable aramid is provided which consists essentially of up to about 7 mole percent of first units, about 30 to about 70 mole percent of second units, and about 70 to about 30 mole percent of units derived from ODA and T ("third units" herein). Such polymers, especially in fiber form, may be drawn to give highly oriented crystalline fibers with much improved tensile strength, as well as high tensile modulus at a higher elongation beyond that usually obtained with PPD/T polymer. Also provided is a process for drawing such aramids, such that the crystallinity and tensile strength increase markedly.

DETAILS OF THE INVENTION

This invention concerns a drawable aramid random copolymer consisting essentially of about 70 to about 95 mole percent of a first unit of the formula

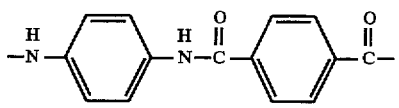

and about 30 to about 5 mole percent of a second unit of the formula

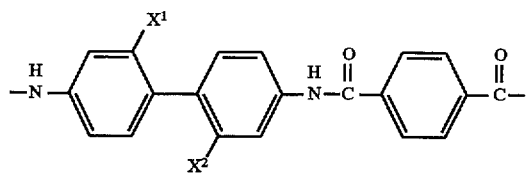

wherein $X^1$ and $X^2$ are independently selected from the group consisting of chlorine, bromine and methyl.

It is preferred if the polymer contains about 78 to about 92 mole percent of first units and about 22 to about 8 mole percent of second units. It is more preferred if the polymer contains about 82 to about 91 mole percent of first units and about 18 to about 9 mole percent of second units.

It is also preferred if both $X^1$ and $X^2$ are identical. It is more preferred if $X^1$ and $X^2$ are chlorine.

This invention also concerns a drawable aramid, consisting essentially, of up to about 7 mole percent of a first unit of the formula

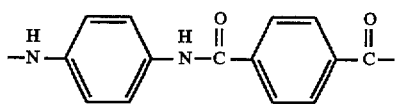

about 30 to about 70 mole percent of a second unit of the formula

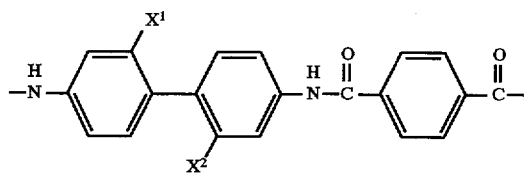

and about 70 to about 30 mole percent of a third unit of the formula

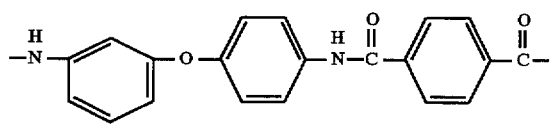

wherein
$X^1$ and $X^2$ are independently selected from the group consisting of chlorine, bromine and methyl.

It is preferred if the polymer contains about 35 to about 65 mole percent of second units and about 65 to about 35 mole percent of third units. It is more preferred if the polymer contains about 45 to about 55 mole percent of second units and about 55 to about 45 mole percent of third units. It is also preferred that the first units should not exceed about 5%.

It is also preferred if $X^1$ and $X^2$ are identical. It is more preferred if each $X^1$ and $X^2$ is chlorine or methyl.

The 2,2'-disubstituted-4,4'-diaminobiphenyls can be made by methods known in the art. For example, a general procedure for converting a nitrobenzene to a hydrazobenzene and thence to a benzidine (diaminobiphenyl), as described by C. A. Buehler and D. E. Pearson, Survey of Organic Synthesis, Wiley, New York, 1970, p. 504, may be adapted for the use of meta substituted nitrobenzenes to synthesize 2,2'-disubstituted benzidines.

The polymers may be made by techniques that are known for making prior art aramids, for example see British Patent 1,547,802 and U.S. Pat. No. 3,673,143. The polymers as made should be of sufficient molecular weight so that fiber or films may be formed. Thus, the polymers containing only first and second units should have an inherent viscosity of about 4 or more (for the procedure for measuring inherent viscosity, see below), and polymers containing second and third units should have an inherent viscosity of about 2 or more. Such polymers may be spun into fibers or made into other shapes by methods known for prior art aramids, see for example U.S. Pat. No. 3,673,143, Example 2 for forming a film, and U.S. Pat. No. 3,767,756 for spinning a fiber. All of the operations listed in this paragraph are illustrated in the Examples.

One preferred form of this composition is as an essentially undrawn fiber, which has a tensile strength of at least about 15 grams per denier and an elongation to break of at least about 5 percent.

The instant polymers, are drawable, and upon drawing exhibit greatly improved properties compared with undrawn polymer, particularly tensile strength. In order for aramid polymers to be drawable, and upon drawing to exhibit optimal physical properties, it is believed, but Applicant does not wish to be bound by, the hypothesis that aramid polymers must have the following intrinsic properties: that they be soluble in a solvent for fiber spinning; that they be stable under the drawing conditions (especially high temperature); that they be largely amorphous in the as-spun (undrawn) state; and that they exhibit significant crystallinity and high orientation in the drawn state. Polymers containing only first and second units are soluble in sulfuric acid, while polymers containing second and third units are soluble in N-alkylamide solvents, such as N-methylpyrrolidone. While many aramids may meet some of these conditions, Applicant believes that only a small fraction of all aramid polymers theoretically possible would meet all these conditions.

The drawable polymers of this invention are useful in fibers and films where high tensile strength and tensile modulus are important, as for ropes and composites.

Also included in this invention is a process for drawing aramids, comprising,
(a) heating an aramid to a temperature at which said aramid can be drawn;
(b) drawing said aramid at said temperature by applying sufficient force to draw said aramid;
provided that:
said aramid is drawn at least 1.5%;
said drawn aramid has an apparent crystallite size of 35 Angstroms or larger;
said drawn aramid has an orientation angle of 12° or less;
said drawn aramid has a tensile strength of about 20 grams per denier or more; and
the tensile strength of said drawn aramid is at least 1.15 times that of said undrawn aramid.

The preferred temperature for drawing is about 350° C. to about 575° C., most preferably about 400° C. to about 520°

C. The temperature needed for any particular aramid can be readily determined by heating the aramid (say a film or fiber) to a given temperature and trying to draw by hand (see Example 1). If no draw is apparent higher temperatures should be tried.

The force needed to draw the fiber is determined by relatively easy experimentation. The aramid can be drawn to a specific draw value, provided that the aramid does not break at that amount of draw. Alternatively the aramid can be drawn by a certain force (but less than that required to break the aramid). This force can be readily determined for any aramid and temperature by heating the aramid to drawing temperature and applying a just enough force to draw it while measuring the force with a tension gauge.

By the phrase "drawn at least X%" is meant the value computed by the following formula:

$$\frac{(\text{final length}) - (\text{original length})}{\text{original length}} \times 100$$

It is preferred if the aramid is drawn at least 3%, more preferred if the aramid is drawn at least about 4%, and most preferred if the aramid is drawn at least about 6%. It is also preferred if the aramid is drawn at least about 400%. It is also preferred if the tensile strength of the drawn aramid is at least 1.25 times the tensile strength of the undrawn aramid.

The orientation angle is 12° or less, preferably 10° or less, more preferably 8° or less. The orientation angle may be measured (in fibers) by the following method:

A bundle of filaments about 0.5 mm in diameter is wrapped on a sample holder with care to keep the filaments essentially parallel. The filaments in the filled sample holder are exposed to an X-ray beam produced by a Philips X-ray generator (Model 12045B) operated at 40 kv and 40 ma using a copper long fine-focus diffraction tube (Model PW 2273/20) and a nickel beta-filter.

The diffraction pattern from the sample filaments is recorded on Kodak DEF Diagnostic Direct Exposure X-ray film, in a Warhus pinhole camera. Collimators in the camera are 0.64 mm in diameter. The exposure is continued for about fifteen to thirty minutes (or generally long enough so that the diffraction feature to be measured is recorded at an optical density of ~1.0).

A digitized image of the diffraction pattern is recorded with a video camera. Transmitted intensities are calibrated using black and white references, and gray level (0–255) is converted into optical density. The diffraction pattern of fibers of this invention has two prominent overlapping equatorial reflections at a scattering angle of approximately 20° and 22°; the inner (~20°) reflection is used for the measurement of Orientation Angle. A data array equivalent to an azimuthal trace through the two selected equatorial peaks (i.e. the inner reflection on each side of the pattern) is created by interpolation from the digital image data file; the array is constructed so that one data point equals one-third of one degree in arc.

The Orientation Angle is taken to be the arc length in degrees at the half-maximum optical density (angle subtending points of 50 percent of maximum density) of the equatorial peaks, corrected for background. This is computed from the number of data points between the half-height points on each side of the peak (with interpolation being used, that is not an integral number). Both peaks are measured and the Orientation Angle is taken as the average of the two measurements.

The apparent crystallite size of the drawn aramid is at least 35 Angstroms, preferably at least about 45 Angstroms, and more preferably 55 Angstroms. Apparent crystallite sizes of 35 Angstroms or larger are believed to denote significant crystallinity in the aramid, and an improvement in properties, especially tensile modulus. The apparent crystallite size is measured by the following procedure:

Apparent Crystallite Size is derived from X-ray diffraction scans, obtained with an X-ray diffractometer (Philips Electronic Instruments; cat. no. PW1075/00) in reflection mode, using a diffracted-beam monochromator and a scintillation detector. Intensity data are measured with a rate meter and recorded by a computerized data collection and reduction system. Diffraction scans are obtained using the instrumental settings:

Scanning Speed: 1° 2θ per minute

Stepping Increment: 0.025° 2θ

Scan Range: 15° to 30° 2θ

Pulse Height Analyzer: Differential

Diffraction data are processed by a computer program that smooths the data, determines the baseline, and measures peak locations and heights.

The diffraction pattern of fibers from this invention is characterized by two prominent equatorial X-ray reflections. These peaks, occurring at approximately 20°–21° and 22° 2θ (scattering angle), overlap substantially and may be difficult to resolve. Apparent Crystallite Size is calculated from the measurement of the half-height peak width of the first (lower scattering angle) equatorial diffraction peak. Because the two equatorial peaks overlap, the measurement of the half-height peak width is based on the half-width at half-height. For the 20°–21° peak, the position of the half-maximum peak height is calculated and the 2θ value corresponding to this intensity is measured on the low angle side. The difference between this 2θ value and the 2θ value at maximum peak height is multiplied by two to give the half-height peak (or "line") width.

In this measurement, correction is made only for instrumental broadening; all other broadening effects are assumed to be a result of crystallite size. If B is the measured line width of the sample, the corrected line width β is $$\beta = (B^2 - b^2)^{1/2}$$

where 'b' is the instrumental broadening constant. 'b' is determined by measuring the line width of the peak located at approximately 28.5° 2θ in the diffraction pattern of a silicon crystal powder sample.

The Apparent Crystallite Size is given by

| | |
|---|---|
| ACS = | (Kλ)/(β · cos θ), wherein |
| K | is taken as one (unity) |
| λ | is the X-ray wavelength (here 1.5418 Å) |
| β | is the corrected line breadth in radians |
| θ | is half the Bragg angle (half of the 2θ value of the selected peak, as obtained from the diffraction pattern). |

It is preferred if the aramid to be drawn is in the form of a film or fiber, and especially preferred if the aramid is in the form of a fiber.

It is preferred if the aramid consists essentially of about 70 to about 95 mole percent of a first unit of the formula

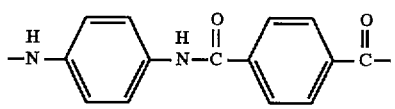

and about 30 to about 5 mole percent of a second unit of the formula

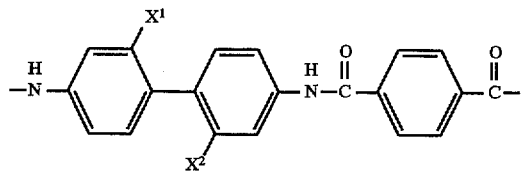

wherein $X^1$ and $X^2$ are independently selected from the group consisting of chlorine, bromine and methyl. Preferred compositions of aramids of this formula are as enumerated above.

It is also preferred if the aramid consists essentially of about up to 7 mole percent of a first unit of the formula

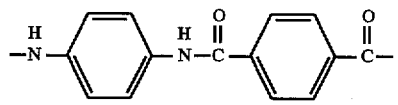

about 30 to about 70 mole percent of a second unit of the formula

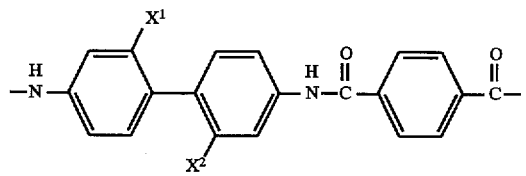

and about 70 to about 30 mole percent of a third unit of the formula

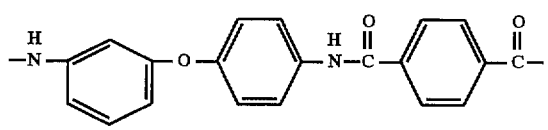

wherein $X^1$ and $X^2$ are independently selected from the group consisting of chlorine, bromine and methyl.

Preferred compositions of aramids of this formula are as enumerated above.

The drawing of aramids in the present invention occurs in the substantial absence of water or other solvents. By substantial absence of water or other solvent is meant less than about 5% water or other solvent, preferably less than about 2%. The molecular weight of the aramids should be high enough to be able to form a fiber.

Thus, the polymers containing only first and second units should have an inherent Viscosity of about 4 or more in sulfuric acid, and polymers containing second and third units should have an inherent viscosity of about 2 or more in N-methylpyrrolidone. A procedure for measuring inherent viscosity is given in U.S. Pat. No. 3,673,143, column 17, lines 10 et. seq., which is hereby included by reference.

It is preferred if the aramid before drawing has an apparent crystallite size of 30 Angstroms or less. This means that the apparent crystallite size will increase during the drawing process.

The apparatus useful for drawing the aramids may be quite varied. It may even be done by hand, but for production more automated continuous processes are desirable. Apparatus useful for such processes are disclosed in U.S. Pat. Nos. 3,869,430 and 4,500,278, which are hereby included by reference.

In the following examples, fiber properties are measured by methods described in U.S. Pat. No. 3,869,429, column 10 line 28 to column 11, line 10, which is hereby included by reference. Orientation angles and apparent crystallite sizes were measured as described supra.

EXAMPLES

Example 1

In a flamed-out resin kettle, fitted with an external ice cooling bath, a cage-type stirrer, a slow blanketing flow of dry nitrogen, a thermometer, and provision for addition of a solid anhydrous, powdered calcium chloride (61.0 g; 0.555 mole) was dissolved in anhydrous N-methyl-pyrrolidone (652 ml; 672 g). In this solvent, at room temperature, was dissolved p-phenylenediamine (35.497 g; 0.328 mole) and 2,2'-dichlorobenzidine (17.032 g; 0.067 mole). To this stirred solution, cooled at 0°–5° C. was added quantitatively in a single addition terephthaloyl chloride (80.388 g; 0.396 mole). The mixture was allowed to rise in temperature with heat of reaction. The clear liquid formed initially when all the diacid chloride had dissolved changed within minutes to a hard gel which was broken up under the action of the stirrer to a crumb-like material. This was maintained under agitation for about 3 hr at ambient temperature.

Polymer was isolated by treating the polymerizate, in a blender with excess water, filtered, washed thoroughly with water on the filter and dried to constant weight in an oven at 80° C. under vacuum during about 15 hr. Inherent viscosity in 100% $H_2SO_4$ was 4.19 dL/g. DSC indicates melting at 545° C. Rapid weight loss threshold by TGA was 520° C.

In a resin kettle with a cage-type stirrer, under a slow-flowing blanket of dry nitrogen 355 g of 100% $H_2SO_4$ was cooled with stirring by an external bath of dry ice. It froze to a snow-like consistency. To this "snow" was added, with stirring, in five lots during 2 hr, a total of 85 g dry polymer (above). Stirring was continued as the cooling bath was removed, and warmed up to room temperature. Formation of a viscous, opalescent, spin dope was completed with 5 hr of mixing at 70° C. This gave 19.3% (w/w) concentration.

The warm, still-fluid dope was transferred to a stainless steel cylinder of about 300 ml capacity equipped with external electrical heating. The top of the cylinder, above the dope, was fitted with a piston. The exit of the cylinder, at the bottom was connected immediately, via a series of fine-mesh stainless steel screens to a lower, identical cylinder, fitted with connection to a vacuum pump. Application of reduced pressure sucked the dope, heated at 70° C., through the screens into the lower vessel, thereby eliminating entrained gas bubbles and filtering out any adventitious coarse particulate.

The upper vessel was then removed, a piston fitted to the lower one above the dope, connected with a plunger which could be drive downwards at a desired, constant velocity by a motor-driven screw mechanism. The exit to the lower vessel, with vacuum port closed, was connected directly with a spinneret pack containing a filtration device of Dynalloy, in sequence with several mesh screens and fitted with a 10-hole spinneret each of 0.0025" diameter and 0.0065" length which could be maintained at any given temperature by external heating.

The dope was extruded from the spinneret, through an air-gap of 0.6 cm into a coagulant water bath. For this water in a surrounding reservoir overflowed into a narrow control outlet pipe about 20 cm long. Fibers contacted the water at the top of this overflow pipe and proceeded cocurrently down the outlet pipe into a larger, more or less static, flat water bath. Fibers passed round a roller pin contained in this bath at an angle of less than 90° C., to a wind-up bobbin which was continuously sprayed with water to ensure removal of all acid. The bobbins of fiber were then soaked overnight in water at 25° C., before being allowed to dry out on the bench top at ambient temperature during 24 hr. Optimum spinning conditions consisted of winding up at 250 m/min.

Average as-spun fiber properties—tenacity (T)/elgonation (E)/modulus (Mi)/toughness (To)/denier per filament (dpf) for five filament specimens were 17.0 gpd (grams per denier)/6.25%/404 gpd/0.55 gpd/1.40. Highest individual break was 18.1/6.1/487/0.57/1.48. The stress-stain curve featured a distinct "knee". The orientation angle is 19.7°. Apparent crystallite size is 25 Å.

Bundles of filaments (10 or more), about 12" long, were held between the two hands under moderate tension and moved forward in a single continuous motion across an arced hot plate (1" contact length; diameter 2"), maintaining the modest tension such that any natural tendency for the fiber to draw was facilitated (without use of excessive force which usually causes breakage). At 490° C. a draw of 6% was realized by the increase in distance between two inch marks on the fiber. (Under the same conditions as-spun PPD-T [Kevlar®29] showed no drawability whatever). At lower temperatures drawability was less. At higher temperatures the fiber tended to break. Average (of 3) T/E/Mi/To/dpf were 26.7/4.6/736/0.64/1.21 and highest single break was 27.9/4.8/718/0.69/1.12. The orientation angle was 8.8°. Apparent crystallite size is 56 Å.

As-spun fiber, described above, was fed from a storage bobbin to a pair of feed rolls, whence it was fed across a heated plate (as used in hand-drawing) to a wind-up roll. The ratio of wind-up to feed rolls was optimally 1.09, i.e., a 9% draw ratio for a feed rate of 1 ft/min and plate temperature of 490° C. There appeared to be no intrinsic barrier to feed rate although, in this experiment, a low rate was used to control static. Average T/E/Mi/To/dpf =25.5/4.2/702/0.545/1.29 with highest break 28.0/4.1/835/0.588/1.20. The orientation angle is 8.6°, and apparent crystallite size is 48 Å.

Another batch of polymer made in exactly the same way had an inherent viscosity of 4.2 in sulfuric acid. Three batches of fiber were spun and drawn under various conditions. The physical properties are given below.

| Draw Temp. (°C.) | Draw (%) | T/E/M (drawn) |
|---|---|---|
| As-Spun T/E/M - 14.1/5.1/445 | | |
| 500 | 1.8 | 18.7/4.0/653 |
| 500 | 2.2 | 21.8/4.5/622 |
| 525 | 2.2 | 20.1/3.8/680 |
| 525 | 2.7 | 24.6/5.3/563 |
| 550 | 1.7 | 17.8/3.9/611 |
| 550 | 2.3 | 25.0/4.9/680 |

| Draw Temp. (°C.) | Draw (%) | T/E/M (drawn) |
|---|---|---|
| As-Spun T/E/M - 17.5/7.5/36.6 | | |
| 525 | 1.5 | 24.8/5.6/549 |
| 550 | 1.8 | 25.9/4.6/730 |
| As-Spun T/E/M - 14.1/5.1/445 | | |
| 500 | 2.0 | 23.4/4.2/683 |
| 500 | 2.8 | 22.5/3.7/1108 |
| 525 | 1.8 | 25.9/4.8/646 |
| 525 | 2.5 | 20.1/3.7/633 |
| 550 | 2.3 | 23.2/4.0/705 |
| 550 | 3.1 | 27.4/4.8/754 |
| 575 | 1.9 | 26.8/4.7/496 |
| 575 | 2.6 | 24.5/4.0/987 |

Example 2

By the same procedure as described in Example 1, terephthaloyl chloride (80.39 g; 0.396 mole) was added to a solution of p-phenylenediamine (32.08 g; 0.297 mole) and 2,2'-dichlorobenzidine (25.05 g; 0.099 mole) in N-methylpyrrolidone (672 g; 652 mole) containing dissolved anhydrous $CaCl_2$ (61.0 g; 0.554 mole). The crumb-like gel product was allowed to stand at 21° C. for 5 days, then treated with excess water to precipitate the polymer, which was then thoroughly washed with water, filtered, washed with acetone and dried overnight at 80° C. during 15 hr. Inherent viscosity in sulfuric acid was ~5.92.

Copolymer (85.0 g; as prepared above) was dissolved in 355 g 100% sulfuric, as described in Example 1, to give a 19.3% (w/w) solution.

The dope, heated at 78° C. in a reservoir, was extruded as described in Example 1 through a 10-hole spinneret, each hole of 0.003" diameter and 0.009" length, at 79° C., via a 0.6 cm air-gap into water at 0°–5° C. Extrusion velocity was 17.7 m/min and windup at 117 m/min, for a spin-stretch factor of 6.6. Washed, dried fibers had average T/E/Mi/To/dpf=15.5 gpd/6.20%/362 gpd/0.486 gpd/1.53 dpf. Highest individual specimen was 16.5/6.47/334/0.526/2.00. Wide angle X-ray showed an orientation angle of 21.7° C. Apparent crystallite size was 20 Å.

Fibers were hand drawn, as in Example 1 by 3–6% at 490° C. Average T/E/Mi/To/dpf were 18.4/3.64/648/0.356/1.31 with best individual specimen 21.5/4.24/0.492/1.43. Orientation angle was 11.5°. Apparent crystallize size was hardly changed, now 21 Å.

Example 3

The same procedure as in Example 1 was used with terephthaloyl chloride (36.17 g; 0.178 mole), p-phenylenediamine (17.32 g; 0.160 mole), 2,2'-dichlorobenzidine (4.51 g; 0.018 mole), N-methylpyrrolidone (302.5 g; 293 ml) and $CaCl_2$ (27.45 g; 0.25 mole). Inherent viscosity was 4.13 in sulfuric acid.

Copolymer solution in sulfuric acid at 19.3% solids was prepared using 42.5 g polymer and 177.5 g sulfuric acid was made by the same procedure as in Example 1.

Fiber was spun similarly to Example 1. Average T/E/Mi/To/dpf were 15.16/5.25/485/0.443/4.47 with best specimen 17.06/6.2/508/0.592/3.9. Orientation angle was 16.4° and apparent crystallite size was 16.6 Å.

Hand-drawing of 3% at 495° C. gave T/E/Mi/To/dpf= 22.65/3.17/774/0.363/3.8 with best specimen 23.61/3.29/

821/0.392/3.5. Orientation angle was 7.5° and the apparent crystallite size was 81 Å.

Example 4

In a flamed-out resin kettle equipped with a cage-type stirrer in liquid thermometer, a slow supernatant flow of dry nitrogen, provision for external ice-cooling, and provision for solids addition, 5.570 g 3,4'-oxydianiline (0.0281 mole) and 7.117 g 2,2'-dichlorobenzidine (0.0281 mole) were dissolved in 223 ml anhydrous N-methylpyrrolidone (230 g). To the stirred solution, cooled to 5°–10° C. was added all at once 11.421 g terephthaloyl chloride (0.563 mole). As polymer formed, the viscosity of the solution increased considerably, with some rise in temperature despite external cooling, during the initial 15 minutes. Stirring at room temperature was continued for 2 hr. To the viscous clear solution was added 3.15 g anhydrous CaO (0.563 mole) to convert by-product HCl to $CaCl_2$. The resulting clear solution subsequently gelled after standing at room temperature but was readily fluidized again by warming.

Films (0.015 inch thickness) were cast from the above solution, heated to 80° C., on to clean glass plates, preheated to about 80° C. in an oven, using a doctor knife. The films were dried in a circulating air oven at 80° C. for 3 hr, then soaked overnight in water at 25° C. to extract $CaCl_2$ and residual solvent. The clear, almost colorless films, were divided into ¼ inch wide strips.

Film strips were stretched by hand in a single continuous forward motion across a semi-circular heated steep plate of radius 1 inch and contact distance 1–2 inches. Tension was adjusted such that strips did not break nor were damaged by undue stretching. 400–700% drawing was possible at plate surface temperatures of 475°–515° C. Thus, the average (of 5 specimens) tensile strength/break elongation/modulus and denier for 500% draw at 505° C. was 8.4 gpd (11.1 gpd)/2.0%(2.6%)/303 gpd(476 gpd)/257 den. Highest individual breaks are given in parenthesis. Stress-strain curves were linear but did not generally attain maximum values because of sequential breakage of component fibrils within he film. The wide-angle X-ray diffractogram of specimens drawn 700× at 515° C. showed an extremely high development of crystallinity with apparent crystallite size of 110 showed an extremely high development of crystallinity with apparent crystallite size of 110 Å and an orientation angle of 4.1°.

Comparative Example 1 p-Phenylenediamine/3,4'-oxydianiline (50/50) terphthalamide polymer of ηinh=3.01 made by a precisely analogous polymerization, cast as film, and strips drawn as before. 450–1550% drawability was observed in the 400°–490° C. range. As an example, specimens drawn 1500% at 475° C. had T/E/Mi average values of 14.7 gpd(18.4 gpd)/4.1% (4.5%)/384 gpd(598)/110 den with an orientation angle of 11.4° and negligible three-dimensional crystallinity as judged by the absence of well-defined diffraction spots in the X-ray diffractograms. Apparent crystallite size measured on commercial fiber speciments of this composition was 33 Å with an orientation angle of 15°.

Example 5

As in Example 4, 6.858 g of 3,4'-oxydianiline (0.0343 mole) and 5.784 g of 2,2'-dichlorobenzidine (0.0229 mole) were dissolved in 223 ml of NMP (230 g) were combined with 11.602 g of terephthaloyl chloride (0.0572 mole) to provide a clear, light yellow viscous solution, after neutralization of by-product HCl by reaction with 3.26 g of anhydrous CaO (0.0572 mole). Inherent viscosity of 4.20 was determined by diluting this 8% polymer solution to 0.5% solids with NMP.

Film strips, prepared as in Example 4, were stretched by hand over the hot plate at temperatures in the range of 400° C. (700% draw); at higher temperatures the specimens appeared to melt and break. Typical apparent crystallite sizes of 55 Å and orientation angles in the 5.3°–6.1° range were found. Tenacity values were 6–9 gpd; break elongations were 2.3–5.5%; initial modulus values were 170–290 gpd for various specimens.

Example 6

The same procedure as Example 4 was used whereby terephthaloyl chloride (26.39 g.; 0.130 mole) was combined with a mixture of 3,4'-oxydianiline (13.00 g.; 0.065 mole) and 2,2'-dimethylbenzidine (13.78 g.; 0.065 mole) dissolved in anhydrous N-methylpyrrolidone (485 g.) containing calcium chloride (15.0 g.) at 5°–10° C. This afforded a clear gel which was converted to a viscous liquid by heating at 100° C. to which was added calcium oxide (7.28 g.; 0.130 mole) to neutralize by-product.

Film strips, prepared as in Example 4, having tenacity/elongation/modulus of 1.3 gpd/32%/24 gpd, and negligible crystallinity and orientation, were stretched across a 2-inch semicircular plate optimally 500% at 430° C. to provide T/E/Mi as high as 6.0 gpd/2.5%/313 gpd; in these specimens fibrils broke sequentially in the testing process. Drawn fibers had orientation angle of 6.7° and apparent crystallite size of 90 Å.

Example 7

Using the same procedure as Example 4, terephthaloyl chloride (11.27 g.; 0.056 mole) was combined with 3,4'-oxydianiline (4.44 g.; 0.022 mole) and 2,2'-dichlorobenzidine (8.43 g.; 0.033 mole) in N-methylpyrrolidone (230 g.). The resultant gel was fluidized by heating at 120° C., and neutralized with calcium oxide (3.11 g.; 0.056 mole). Inherent viscosity was 4.55 in N-methylpyrrolidone.

The polymer was precipitated by treatment with excess water, separated, dried, and redissolved in N-methylpyrrolidone containing 5% calcium chloride to form a 7% solution of polymer. AS in Example 4, film strips, having tenacity/elongation/modulus of 1.1 gpd/15%/37 gpd and negligible crystallinity and orientation, were drawn 575% at 500° C. to give T/E/Mi=8.5(9.3)/2.5(2.8)%/414(404) (highest tenacity value in parentheses) and an X-ray diffractogram identical with those of Examples 4 and 5 and showing a very high degree of crystallinity and orientation.

Example 8

The procedure of example 4 was repeated using 3,4'-oxydianiline (6.25 g.; 0.031 mole), 2,2'-dichlorobenzidine (7.12 g.; 0.028 mole), p-phenylenediamine (0.034 g.; 0.003 mole) in N-methylpyrrolidone (243 g.) containing 3% anhydrous calcium chloride (7.3 g.), treated with terephthaloyl chloride (12.69 g.; 0.063 mole), and later neutralized by calcium oxide (3.5 g.; 0.063 mole). Inherent viscosity in N-methylpyrrolidone was 3.17, and in sulfuric acid was 1.79.

Film strips, prepared and treated as in Example 4. As-cast specimens were amorphous (apparent crystallite size, 8 Å by wide angle X-ray) and unoriented, with tenacity/elongation/ modulus of 1.4 gpd/48%/23 gpd. These were drawn 750% at 470° C. to provide T/E/Mi of 10.3(13.7) gpd/2.9(3.9)%/224 (250) gpd (highest individual specimen in parentheses), and apparent crystallite size of 45 Å and orientation angle of 7.5° C.

Example 9

By the same procedure as Example 1, terephthaloyl chloride (79.37 g; 0.391 mole) was combined with a solution of p-phenylenediamine (35.05 g.; 0.325 mole) and 2,2'-dichlorobenzidine (14.09 g.; 0.066 mole) in N-methylpyrrolidone (672 g.) containing dissolved anhydrous calcium chloride (60.21 g.). The resultant stiff gel or crumb was treated with excess hot water and the precipitated polymer filtered off, washed with acetone and dried at 100° C./48 hr. Inherent viscosity of the polymer was 4.22 in 100% sulfuric acid.

The copolymer (18.59 g.) was combined with 100% sulfuric acid (76.23 g.) in an Atlantic mixer pre-chilled with dry-ice such that the acid was frozen, with the consistency of snow. The mixture on warming to 80° C. for 3 hr. with stirring gave a liquid crystalline solution (19.6% solids). This solution was spun to fiber, as described in Example 1, having T/E/Mi/den.=6.8 gpd/4.3%/270 gpd/4 dpf. Specimens of fiber were stretched by hand across a hot pin at temperatures of 500°–575° C. to give T/E/Mi values typified by 15.4 gpd/3.2%/603 gpd and a best level of 20.2 gpd/3.3%/569 gpd.

Although preferred embodiments of the invention have been described hereinabove, it is to be understood that there is no intention to limit the invention to the precise constructions herein disclosed, and it is to be further understood that the right is reserved to all changes coming within the scope of the invention as defined by the appended claims.

What is claimed is:

1. A process for drawing aramids, comprising, heating an aramid selected from the group consisting of:
aramid A consisting essentially of about 70 to about 95 mole percent of a first unit of the formula

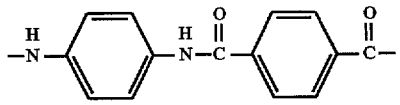

and about 30 to about 5 mole percent of a second unit of the formula

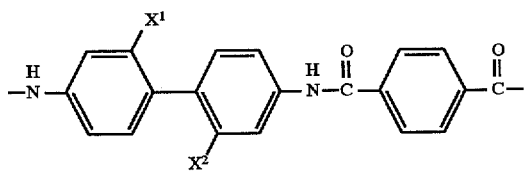

wherein $X^1$ and $X^2$ are independently selected from the group consisting of chlorine, bromine and methyl; and aramid B consist essentially of about up to 7 mole percent of a first unit of the formula

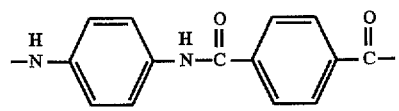

about 30 to about 70 mole percent of a second unit of the formula

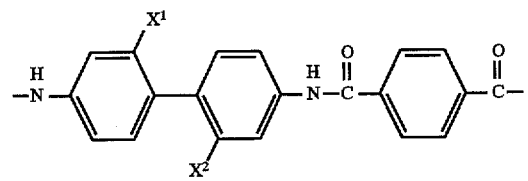

and about 70 to about 30 mole percent of a third unit of the formula

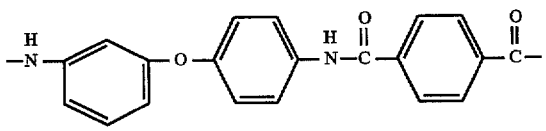

wherein
$X^1$ and $X^2$ are independently selected from the group consisting of chlorine, bromine and methyl
to a temperature at which said aramid can be drawn;
drawing said aramid at said temperature by applying sufficient force to draw said aramid;
provided that:
said aramid is drawn at least 1.5%;
said drawn aramid has an apparent crystallite size of about 35 Angstroms or larger;
said drawn aramid has an orientation angle of 12° or less;
said drawn aramid has a tensile strength of about 20 grams per denier or more; and
the tensile strength of said drawn aramid is at least 1.15 times that of said undrawn aramid.

2. The process as recited in claim 1 wherein said temperature is about 350° C. to about 575° C.

3. The process as recited in claim 1 wherein said temperature is about 400° C. to about 520° C.

4. The process as recited in claim 1 wherein said aramid is drawn at least 3%.

5. The process as recited in claim 1 wherein said aramid is drawn at least about 4%.

6. The process as recited in claim 1 wherein said aramid is drawn at least about 6%.

7. The process as recited in claim 1 wherein said aramid consists essentially of about 70 to about 95 mole percent of a first unit of the formula

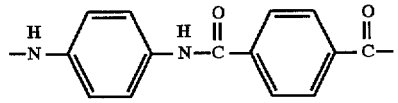

and about 30 to about 5 mole percent of a second unit of the formula

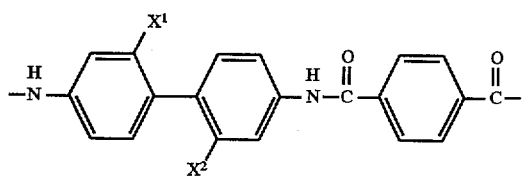

wherein $X^1$ and $X^2$ are independently selected from the group consisting of chlorine, bromine and methyl.

8. The process as recited in claim 7 wherein said aramid contains about 78 to about 92 mole percent of said first units and about 18 to about 8 mole percent of said second units.

9. The process as recited in claim 8 wherein said $X^1$ and said $X^2$ are chlorine.

10. The process as recited in claim 9 wherein the temperature is about 350° C. to about 575° C.

11. The process as recited in claim 1 wherein said apparent crystallite size is at least about 35 Angstroms.

12. The process as recited in claim 11 wherein said apparent crystallite size is at least about 45 Angstroms.

13. The process as recited in claim 12 wherein said apparent crystallite size is at least about 55 Angstroms.

14. The process as recited in claim 1 wherein said orientation angle is 12° or less.

15. The process as recited in claim 12 wherein said orientation angle is 10° or less.

16. The process as recited in claim 15 wherein said orientation angle is about 8° or less.

17. The process as recited in claim 1 wherein said apparent crystallite size is at least about 45 Angstroms and said orientation angle is 10° or less.

18. The process as recited in claim 3 wherein said apparent crystallite size is at least about 45 Angstroms and said orientation angle is 10° or less.

19. The process as recited in claim 5 wherein said apparent crystallite size is at least about 45 Angstroms and said orientation angle is 10° or less.

20. The process as recited in claim 7 wherein said apparent crystallite size is at least about 45 Angstroms and said orientation angle is 10° or less.

21. The process as recited in claim 8 wherein said apparent crystallite size is at least about 45 Angstroms and said orientation angle is 10° C. or less.

22. The process as recited in claim 10 wherein said apparent crystallite size is at least about 45 Angstroms and said orientation angle is 10° or less.

23. The process as recited in claim 1 wherein a fiber is drawn.

24. The process as recited in claim 7 wherein a fiber is drawn.

25. The process as recited in claim 22 wherein a fiber is drawn.

26. The process as recited in claim 23 in the presence of no more than about 5% solvent.

27. The process as recited in claim 24 in the presence of no more than about 5% solvent.

28. The process as recited in claim 25 in the presence of no more than about 5% solvent.

29. The process as recited in claim 1 wherein said aramid consists essentially of about up to 7 mole percent of a first unit of the formula

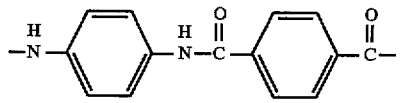

about 30 to about 70 mole percent of a second unit of the formula

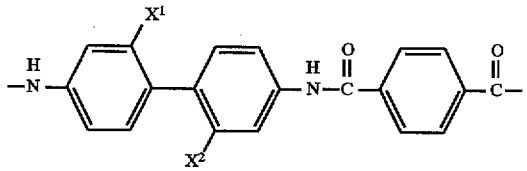

and about 70 to about 30 mole percent of a third unit of the formula

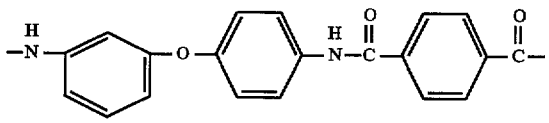

wherein
$X^1$ and $X^2$ are independently selected from the group consisting of chlorine, bromine and methyl.

30. The process as recited in claim 29 wherein said aramid contains about 45 mole percent to about 55 mole percent of said second units and about 55 to about 45 mole percent of said second units.

31. The process as recited in claim 30 wherein each said $X^1$ and said $X^2$ is chlorine or methyl.

32. The process as recited in claim 31 wherein the temperature is about 400° C. to about 520° C.

33. The process as recited in claim 29 wherein said apparent cystallite size is at least about 55 Angstroms and said orientation angle is 8° or less.

34. The process as recited in claim 30 wherein said apparent cystallite size is at least about 55 Angstroms and said orientation angle is 8° or less.

35. The process as recited in claim 32 wherein said apparent cystallite size is at least about 55 Angstroms and said orientation angle is 8° or less.

36. The process as recited in claim 1 wherein said aramid is drawn at least about 400%.

* * * * *